Oct. 21, 1958           J. A. MILLER           2,856,796

FIVE-SPEED PLANETARY TRANSMISSIONS EMPLOYING ONLY EXTERNAL GEARS

Filed Jan. 18, 1957           2 Sheets-Sheet 1

INVENTOR
JAMES A. MILLER
BY *J. Frederick Beckett*
ATTORNEY

| | 27 | 43 | 46 | 28 | 48 |
|---|---|---|---|---|---|
| REVERSE | ● | | | | ● |
| FIRST | ● | ● | | | |
| SECOND | | ● | | | ● |
| THIRD | | ● | | ● | |
| FOURTH | | | ● | ● | |
| FIFTH | | | | ● | ● |

United States Patent Office 2,856,796
Patented Oct. 21, 1958

2,856,796

FIVE SPEED PLANETARY TRANSMISSIONS EMPLOYING ONLY EXTERNAL GEARS

James A. Miller, Battle Creek, Mich., assignor to Clark Equipment Company, a corporation of Michigan Application January 18, 1957, Serial No. 634,909

6 Claims. (Cl. 74—763)

The invention relates generally to multiple speed transmissions and, more particularly, to planetary transmissions of the type especially well suited for use in trucks and other similar heavy duty vehicles.

The invention has for its principal object the provision of an improved transmission characterized by simple, compact construction with the attendant advantages relative to economy of construction and simplicity of installation and maintenance. This object is achieved, in accordance with the present invention, primarily by the use of a transmission employing only externally toothed gears which are relatively easy to manufacture and which readily lend themselves to compact assembly and construction.

It is also an object of this invention to provide an improved transmission having five forward speed drive ratios and one reverse speed, with all ratios being effected by the engagement of controllable friction devices whereby a change of speed ratio may be accomplished without interrupting the flow of torque from the vehicle engine.

It is a further object of the present invention to provide an improved transmission employing three band brakes and two multiple-disk friction clutches which are arranged to be actuated in different pairs in order to complete the aforementioned five forward speed drive ratios and the reverse drive.

Another and more specific object of the present invention is to provide a multiple speed transmission of the character indicated above employing a pair of compound, planetary gear sets connected in tandem between an input shaft and an output shaft and so interrelated that a minimum number of the above-described brakes and clutches is required to provide the five forward speed drive ratios and the reverse drive.

A further object of the present invention is the provision of an improved transmission employing two compound planetary gear sets consisting exclusively of externally toothed gear elements so arranged and interconnected that the aforementioned five forward speed ratios and the reverse drive may be effected.

The invention, both as to its organization and manner of operation, together with further objects and advantages thereof, will best be understood by reference to the specification, taken in conjunction with the accompanying drawings, wherein.

In accordance with the present invention, the foregoing and other objects are realized by providing a transmission including a pair of compound planetary gear sets each consisting exclusively of externally toothed gear elements, which gear sets are connected in series between an input shaft and an output shaft. A first band brake associated with the input gear set provides a major speed reduction therein, while second and third band brakes associated with the output gear set respectively provide major and minor speed reductions therein. A multiple-disk friction clutch may be selectively actuated to interconnect two of the input elements of the input gear set in order to provide a direct drive therethrough.

The input gear set includes a pair of output elements one of which is fixedly connected to a first input element of the output gear set and the other of which is adapted to be connected through a multiple-disk friction type clutch to a second input element of the output gear set in order to provide a second path of power flow between the gear sets. The last-mentioned friction clutch also functions when actuated simultaneously with one of the brakes associated with the output gear set to effect a minor speed reduction in the input gear set. As previously indicated, the three described band brakes and the two multiple-disk friction clutches may be selectively actuated in different pairs in order to provide five forward speed ratios and a reverse drive between the input shaft and the output shaft.

Figure 1:
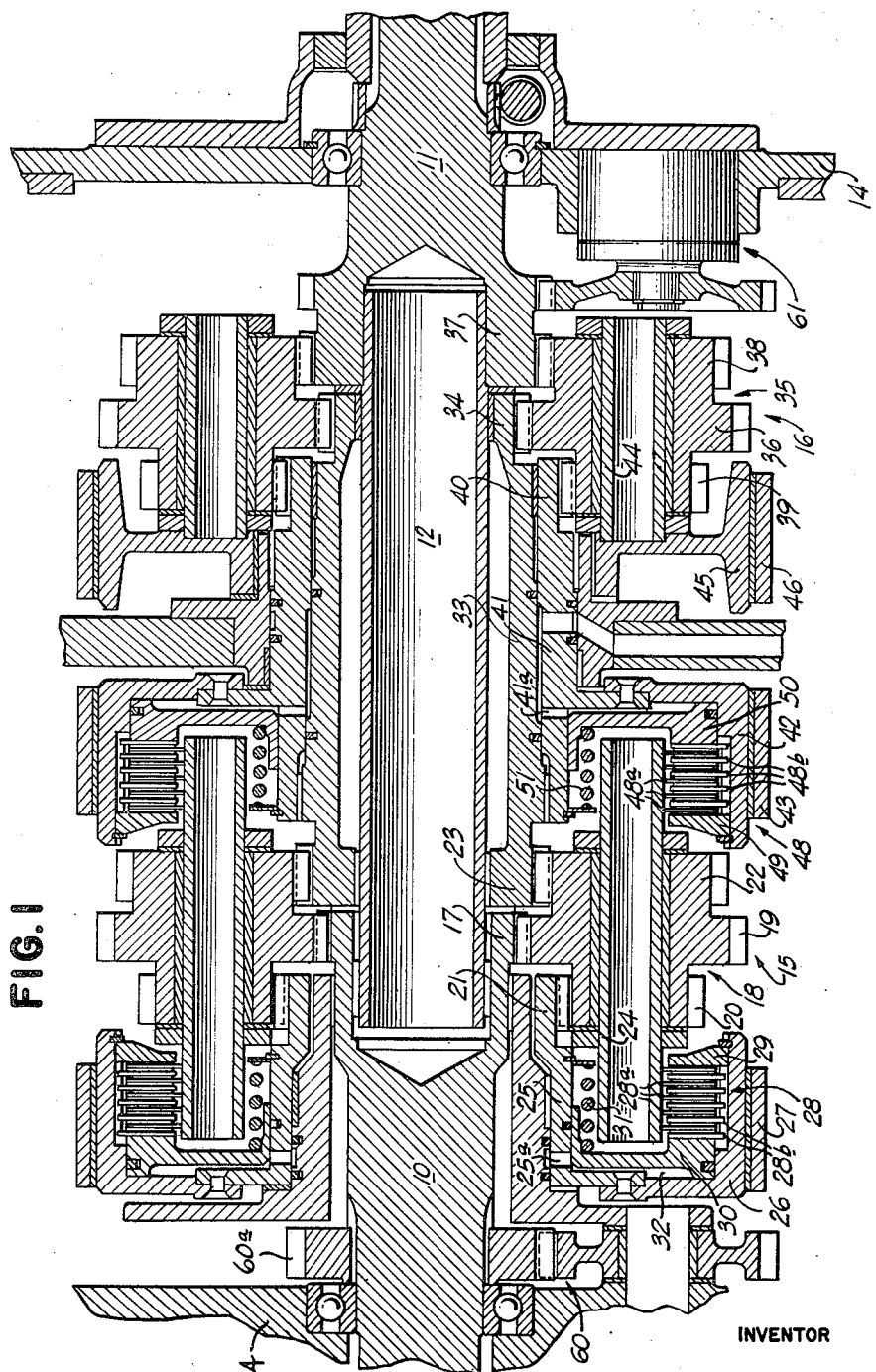
Fig. 1 is a fragmentary, longitudinal view, principally in section, illustrating a transmission characterized by the features of the present invention.
Figures 2, 3:
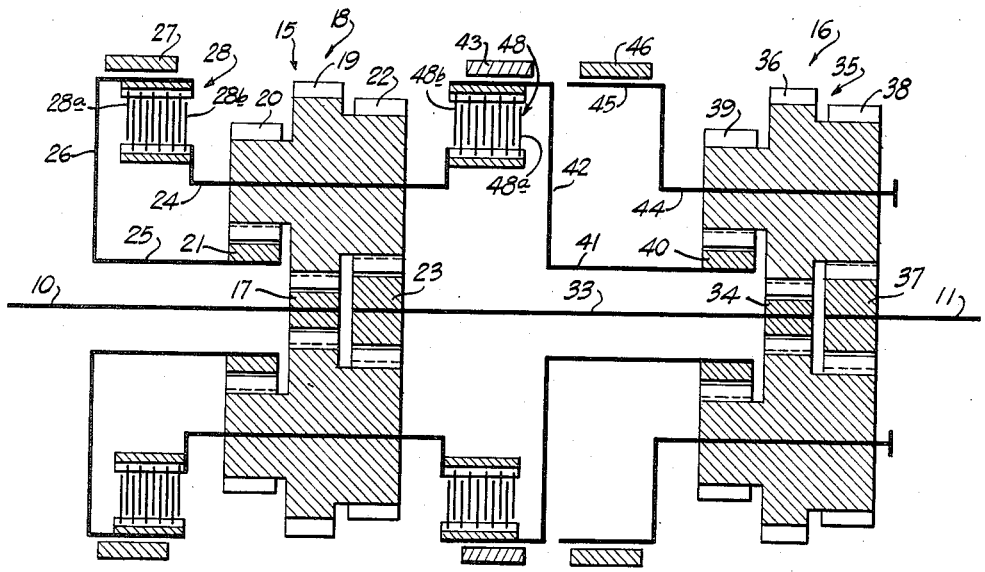
Fig. 2 is a schematic diagram of the transmission shown in Fig. 1.
Fig. 3 is a table showing the various pairs of controllable friction devices which are engaged to complete the different drive ratios through the transmission.

Referring now to the drawings, and more particularly to Figs. 1 and 2 thereof, there is disclosed a mechanism for transferring drive from an input or drive shaft 10 to a driven or output shaft 11 by way of planetary gearing mounted for rotation about a hollow cylindrical intermediate shaft 12 axially aligned with and disposed between the input and output shafts. The input shaft 10 may be connected to the output member of a torque converter or fluid coupling of conventional construction, although this is not shown in the drawings. The output shaft 11 is, of course, adapted to be connected through conventional differential gearing and other suitable connection means to drive the wheels of the vehicle.

As illustrated in Fig. 1, the shafts 10, 11 and 12 have mutually telescoping end portions and are journaled within a suitable transmission casing 14. The latter casing also houses a pair of compound planetary gear sets 15 and 16 connected in tandem between the input shaft 10 and the output shaft 11.

The planetary gear set 15 has a first sun gear 17 formed upon the input shaft 10 and meshing with a step type planet pinion indicated generally at 18. The latter pinion includes a relatively large diameter portion 19 meshing with the sun gear 17, a small diameter portion 20 meshing with a second sun gear 21 and an intermediate diameter portion 22 meshing with a third sun gear 23. The gear portions 19, 20 and 22 of the pinion 18 are axially offset one from the other, as illustrated in Fig. 1 and are rotatably supported upon a planet carrier 24. The sun gear 21 is formed upon an integral extension sleeve 25 secured to an annular drum 26 which may be held stationary by means of a band brake 27 in order to provide torque reaction for the input gear set 15 and establish a major speed reduction therein.

The annular drum 26 also provides a housing for a multiple-disk type friction clutch 28 of conventional construction. The latter clutch includes a plurality of interleaved clutch plates 28a and 28b respectively carried by the planet carrier 24 and by the clutch housing 26. The plates of the clutch 28 are disposed between an annular backing plate 29 splined to the housing 26 and an annular piston 30 longitudinally movable within the housing. Suitable biasing springs 31 normally urge the piston 30 toward the left as viewed in Fig. 1, in order to maintain the clutch plates in disengaged condition. Application of fluid pressure through opening 25a in the sleeve 25 to the space 32 between the piston 30 and the housing 26 moves the clutch plates 28a and 28b into frictional engagement, whereupon the planet carrier 24 and the sun gear 21 of the gear set 15 are connected together to provide a direct drive from the input shaft 10 through the first gear set.

The sun gear 23 is formed upon an elongated sleeve 33 encircling a major portion of and supported for rotation about the intermediate shaft 12. The sleeve 33 also carries a sun gear 34 which serves as an input element to the rear planetary gear set 16. Thus, it will be observed that the sun gear 34 is fixedly connected through the sleeve 33 to the sun gear 23 which may be referred to as a first output element from the input gear set 15. The sun gear 34 drives a planet pinion 35 which is identical to the pinion 18 previously described. Thus, the sun gear 34 meshes with a relatively large diameter portion 36 of the pinion 35, while a second sun gear 37 formed on the output shaft 11 meshes with an intermediate diameter portion 38 and a third sun gear 40, which is formed upon an extension sleeve 41 mounted for rotation about the elongated sleeve 33, meshes with a small diameter portion 39. An annular drum 42 affixed to the sleeve 41 may be held stationary by means of a band brake 43 in order to hold the sun gear 40 to provide torque reaction for the gear set 16 and establish a major speed reduction therein. The pinion 35 is mounted upon a planet carrier 44 which, in turn, carries a brake drum 45. The latter drum may be held stationary by means of a band brake 46 in order to hold the planet carrier 44 stationary, thereby to establish a minor speed reduction in the gear set 16.

The brake drum 42 also serves as a housing for a fluid operated, multiple-disk friction clutch indicated by the reference numeral 48. The latter clutch is similar to the multiple-disk friction clutch 28 previously described, and includes clutch plates 48a and 48b, respectively carried by the planet carrier 24 and by the clutch housing 42. The plates of the clutch 48 are disposed between an annular backing plate 49 splined to the housing 42 and an annular piston 50 which is mounted for slidable movement within the clutch housing. The piston 50 is normally urged to the right as viewed in Fig. 1 by means of biasing springs 51, thereby to maintain the plates 48a and 48b in disengaged condition. Admission of fluid through opening 41a in the sleeve 41 to the face of the piston 50 moves the plates 48a and 48b into frictional engagement, thereby to connect the planet carrier 24 to the sun gear 40.

The transmission casing 14 also encloses a rear pump 61 of conventional construction driven from output shaft 11, which, together with a engine driven front pump (not shown), perform the functions of pressurizing and feeding oil to the torque converter or fluid coupling connected to the input shaft 10, providing lubrication for the transmission gearing, cooling the friction brakes and clutches, if necessary, and also providing fluid pressure to engage the friction brakes and clutches. Casing 14 also carries a gear 60 which is in mesh with a gear 60a splined to input shaft 10, providing for a power takeoff drive, if desired.

As previously indicated, the transmission of the present invention is particularly well suited for use on trucks or other heavy duty vehicles and, to this end, provides a neutral condition, together with five forward speed drive ratios and a single reverse drive. The transmission may be operated either automatically or manually by simultaneously applying different pairs of the clutches and brakes. For automatic operation the clutches 28 and 48 and the brakes 27, 43 and 46 may be operated by the selective application of hydraulic pressure from any suitable control mechanism, as will be readily understood by those skilled in this art.

In neutral condition, both of the clutches and all three of the brakes are disengaged, whereupon torque will be transmitted from the vehicle engine through the torque converter to the shaft 10, thereby to effect rotation of the input sun gear 17 of the gear set 15. No torque is transmitted to the driven shaft 11, in view of the absence of reaction elements in both of the gear sets 15 and 16.

As will be apparent from a study of the table shown in Fig. 3, the first forward speed ratio is established by simultaneously applying the brakes 27 and 43, thereby effecting major speed reductions in both the input and output gear sets in the manner previously described. It will be understood that at this time the brake 46 and the clutches 28 and 48 are not engaged. Rotation of the input shaft 10 then causes the drive to pass from the sun gear 17 through the pinion 18, through sun gear 23 to sun gear 34 and through pinion 35 to the sun gear 37 formed on the output shaft 11.

The second forward speed ratio is obtained by releasing the band brake 27 and applying the clutch 48 while holding the brake 43 applied. With the brake 43 applied, the output planetary gear group 16 obviously remains in major reduction, while actuation of the clutch 48 connects the planet carrier 24 of the input gear set 15 to the applied band brake 43, thereby to hold the planet carrier 24 stationary. In this manner, the input gear set 15 is placed in minor speed reduction and a second forward speed ratio is obtained.

The third forward speed ratio is established by releasing the clutch 48 and applying the clutch 28, while maintaining the band brake 43 engaged. Under these conditions, the output gear set obviously remains in major speed reduction, while the input gear set 15 is locked up for direct drive.

The fourth forward speed ratio is obtained by releasing the band brake 43 and applying the band brake 46 while maintaining the clutch 28 applied. With the clutch 28 applied, the input gear set 15 is locked up for direct drive, while actuation of the band brake 46 places the output gear set 16 in minor speed reduction.

To provide the fifth forward speed drive ratio, the band brake 46 is released and the clutch 48 is applied, while the clutch 28 remains actuated. Under these conditions, the input gear set is locked up for direct drive by the clutch 28 while the clutch 48 connects the planet carrier 24 of the input gear set to the ring gear 40 of the output gear set. The sleeve 33 connects a second element of the output gear set, namely, the sun gear 34, to a second element, the sun gear 23, of the locked input gear set 15. It will be understood, therefore, that the application of the clutches 28 and 48 provides a direct drive from the input shaft 10 to the output shaft 11.

Reverse drive is effected by simultaneously applying the clutch 48 and the band brake 27. As indicated above, major speed reduction is provided in the first gear set 15 when the brake 27 is applied. With the clutch 48 applied, the planet carrier 24 of the gear set 15 is connected to drive the sun gear 40 of the output gear set 16, with the result that a dual path of power flow from the input gear set to the output gear set is provided. The first such path of power flow passes from the sun gear 23, through the sleeve 33 to the sun gear 34. The second such path of power flow passes from the planet carrier 24 through the clutch 48 and through the sleeve 41 to the sun gear 40. Thus, the planet carrier 24 may be referred to as a second output element from the input gear set 15, while the sun gear 40 may be considered as a second input element of the gear set 16. The output planetary gear set 16 functions to recombine the two described paths of power flow and produces a reverse drive of the driven shaft 11.

In view of the foregoing description, it will be recognized that the transmission of the present invention provides five forward speed drive ratios and a reverse drive between the input shaft and the output shaft, with each of these drives being effected by the simultaneous application of a pair of controllable friction devices. Moreover, it will be recognized that the transition from first to fifth speed in each ratio is effected by releasing only one of the controllable devices of each pair, thereby preventing the interruption of torque from the input shaft 10.

While a particular embodiment of the invention has been shown, it will be understood, of course, that the invention is not limited thereto, since many modifications may be made, and it is therefore contemplated by the appended claims to cover any such modifications as fall within the true spirit and scope of the present invention.

What is claimed as new and desired to be secured by Letters Patent of the United States is:

1. A multiple speed transmission for use on heavy vehicles comprising an input shaft, an output shaft, first and second planetary gear sets connected in tandem between said input and output shafts and having externally toothed gear elements exclusively, each of said gear sets having a first sun gear, a planet gear carried upon a planet carrier and including first, second and third gear portions of different diameter offset from each other, the first of said portions meshing with said first sun gear, the second portion meshing with a second sun gear and the third portion meshing with a third sun gear, the first sun gear of the first set being secured to said input shaft, means including an intermediate shaft connecting the second sun gear of the first set directly to the first sun gear of the second gear set, the second sun gear of the second set being secured to said output shaft, means including a first friction device for holding the third sun gear of the first gear set to establish a major speed reduction therein, means including a second friction device for locking up the first gear set to provide direct drive between said input shaft and said intermediate shaft, means including a third friction device for holding the third sun gear of the second set to provide a major speed reduction therein, means including a fourth friction device for holding the planet carrier of the second set to provide a minor speed reduction therein, and means including a fifth friction device for connecting the planet carrier of the first gear set to the third sun gear of the second set, said five friction devices being selectively operable to establish a plurality of forward speed drive ratios between said input and output shafts.

2. The transmission defined by claim 1 wherein said five friction devices are selectively operable in different pairs to establish five forward speed drive ratios and a reverse drive between said input and output shafts.

3. A multiple speed transmission for use on heavy vehicles comprising an input shaft, an output shaft, first and second planetary gear sets connected in tandem between said input and output shafts and having externally toothed gear elements exclusively, each of said gear sets having a first sun gear, a planet gear carried upon a planet carrier and including first, second and third gear portions of different diameter offset from each other, the first of said portions meshing with said first sun gear, the second portion meshing with a second sun gear and the third portion meshing with a third sun gear, the first sun gear of the first set being secured to said input shaft, means including an intermediate shaft connecting the second sun gear of the first set directly to the first sun gear of the second gear set, the second sun gear of the second set being secured to said output shaft, means including a first friction device for holding the third sun gear of the first gear set to establish a major speed reduction therein, means including a second friction device for locking up the first gear set to provide direct drive between said input shaft and said intermediate shaft, means including a third friction device for holding the third sun gear of the second set to provide a major speed reduction therein, means including a fourth friction device for holding the planet carrier of the second set to provide a minor speed reduction therein, and means including a fifth friction device for connecting the planet carrier of the first gear set to the third sun gear of the second set, said five friction devices being selectively operable in different pairs to establish five forward speed drive ratios and a reverse drive between said input and output shafts, the first forward speed ratio being established by applying said first and third friction devices to effect major speed reductions in both of said gear sets, the second forward speed ratio being obtained by applying the third and fifth friction devices to effect minor speed reduction in the first gear set and major speed reduction in the second gear set, the third forward speed ratio being established by applying the second and third friction devices to provide direct drive through the first gear set and major speed reduction in the second gear set, the fourth forward speed ratio being obtained by applying the second and fourth friction devices to obtain direct drive through the first gear set and minor speed reduction in the second gear set, the fifth forward speed ratio being obtained by applying said second and fifth friction devices to provide direct drive from said input shaft to said output shaft, and the reverse drive being obtained by applying said first and fifth friction devices to provide a dual path of power flow from the first gear set to the second gear set.

4. A multiple speed transmission for use on heavy vehicles comprising an input shaft, an output shaft, first and second planetary gear sets connected in tandem between said input and output shafts and having externally toothed gear elements exclusively, each of said gear sets having a first sun gear, a planet gear carried upon a planet carrier and including first, second and third gear portions of different diameter offset from each other, the first of said portions having the largest diameter and meshing with said first sun gear, the second portion meshing with a second sun gear and the third portion having the smallest diameter and meshing with a third sun gear, the first sun gear of the first set being secured to said input shaft, means including an intermediate shaft connecting the second sun gear of the first set directly to the first sun gear of the second gear set, the second sun gear of the second set being secured to said output shaft, means including a first friction device for holding the third sun gear of the first gear set to establish a major speed reduction therein, means including a second friction device for locking up the first gear set to provide direct drive between said input shaft and said intermediate shaft, means including a third friction device for holding the third sun gear of the second set to provide a major speed reduction therein, means including a fourth friction device for holding the planet carrier of the second set to provide a minor speed reduction therein, and means including a fifth friction device for connecting the planet carrier of the first gear set to the third sun gear of the second set, said five friction devices being selectively operable to establish a plurality of forward speed drive ratios between said input and output shafts.

5. The apparatus defined by claim 4 wherein said five friction devices are selectively operable in different pairs to establish five forward speed drive ratios and a reverse drive between said input and output shafts.

6. A multiple speed transmission for use on heavy vehicles comprising an input shaft, an output shaft, first and second planetary gear sets connected in tandem between said input and output shafts and having externally toothed gear elements exclusively, each of said gear sets having a first sun gear, a planet gear carried upon a planet carrier and including first, second and third gear portions of different diameter offset from each other, the first of said portions having the largest diameter and meshing with said first sun gear, the second portion meshing with a second sun gear and the third portion having the smallest diameter and meshing with a third sun gear, the first sun gear of the first set being secured to said input shaft, means including an intermediate shaft connecting the second sun gear of the first set directly to the first sun gear of the second gear set, the second sun gear of the second set being secured to said output shaft, means including a first friction device for holding the third sun gear of the first gear set to establish a major speed reduction therein, means including a second friction device for locking up the first gear set to provide direct drive between said input shaft and said intermediate shaft, means including a third friction device for holding the third sun gear of the second set to provide a major speed reduction therein, means including a fourth friction device for holding the planet carrier of the second set to provide a minor speed reduction therein, and means including a fifth friction device for connecting the planet carrier of the first gear set to the third sun gear of the second set, said five friction devices being selectively operable in different pairs to establish five forward speed drive ratios and a reverse drive between said input and output shafts, the first forward speed ratio being established by applying said first and third friction devices to effect major speed reductions in both of said gear sets, the second forward speed ratio being obtained by applying the third and fifth friction devices to effect minor speed reduction in the first gear set and major speed reduction in the second gear set, the third forward speed ratio being established by applying the second and third friction devices to provide direct drive through the first gear set and major speed reduction in the second gear set, the fourth forward speed ratio being obtained by applying the second and fourth friction devices to obtain direct drive through the first gear set and minor speed reduction in the second gear set, the fifth forward speed ratio being obtained by applying said second and fifth friction devices to provide direct drive from said input shaft to said output shaft, and the reverse drive being obtained by applying said first and fifth friction devices to provide a dual path of power flow from the first gear set to the second gear set.

References Cited in the file of this patent

UNITED STATES PATENTS

| | | |
|---|---|---|
| 2,576,336 | Farkas | Nov. 27, 1951 |
| 2,600,592 | Watson | June 17, 1952 |